United States Patent Office 3,473,297
Patented Oct. 21, 1969

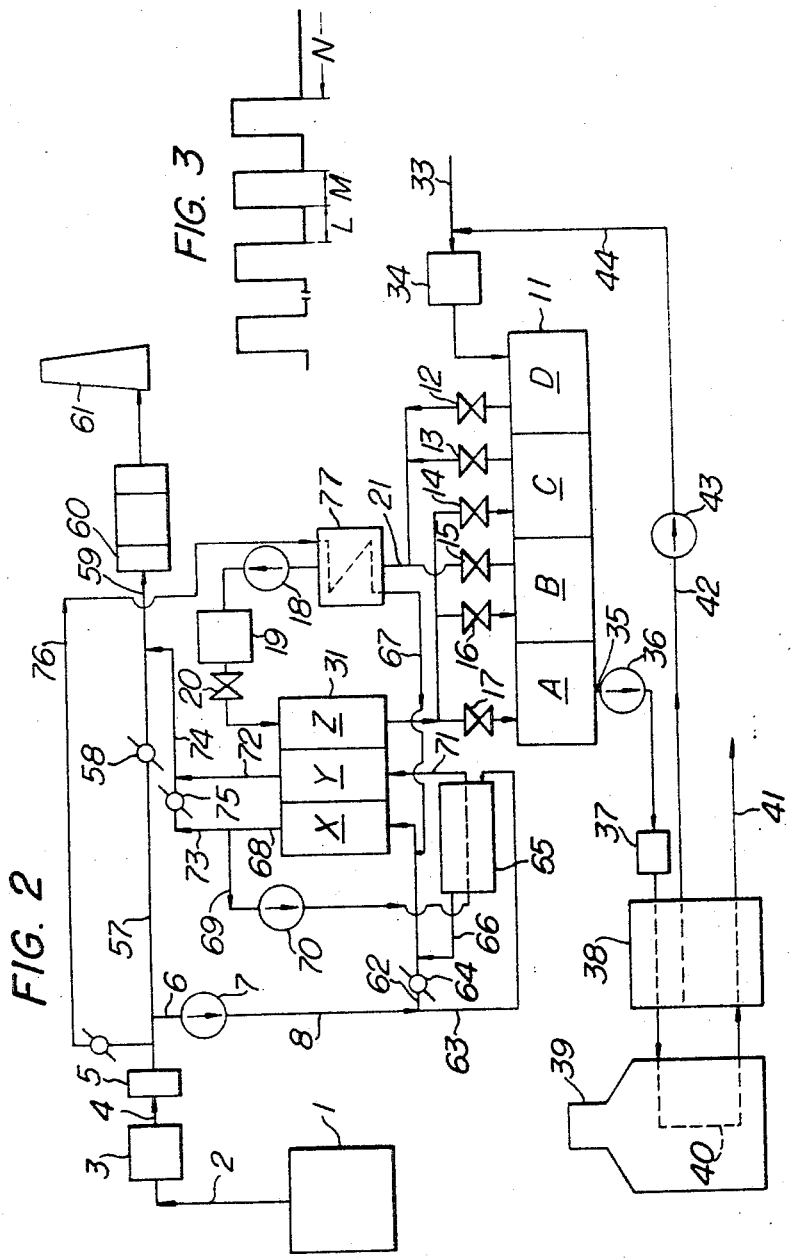

3,473,297
METHOD AND APPARATUS FOR DESULFURIZING COMBUSTION WASTE GASES
Zensuke Tamura and Yukio Hishinuma, Hitachi-shi, Japan, assignors to Hitachi, Ltd., Tokyo, Japan, a corporation of Japan
Filed Sept. 8, 1967, Ser. No. 670,510
Claims priority, application Japan, Sept. 21, 1966, 41/61,976
Int. Cl. B01d 51/04
U.S. Cl. 55—73              12 Claims

ABSTRACT OF THE DISCLOSURE

Method and apparatus for removing sulfur oxides from waste gases by means of active carbon. Same water is repeatedly used for washing away or desorbing from the active carbon the sulfur oxides adsorbed thereby until the concentration of the sulfur oxides within the water reaches a predetermined value at which the water is to be discarded. The apparatus comprises a sulfur oxide adsorption region, water-washing and desorption region and adsorbent drying region and means for pouring water into the desorption region and for heating the water to be poured into the last mentioned region.

BACKGROUND OF THE INVENTION

Field of the invention

The present invention relates to a method of and an apparatus for desulfurizing waste gases from furnaces for gas turbine and boiler or from other industrial furnaces, and more particularly to a manner in which water is used for the desulfurization of waste gases.

Description of the prior art

Desulfurization system (adsorption and desorption system) for the continuous removal of sulfur oxides from waste gases comprises an adsorption region, a water-washing and desorption region and a drying region, and in operation said regions are changed from one after another by shifting the passage of waste gases at a certain time interval. Considering the adsorbment material at a certain position (the description is made hereunder assuming that active carbon is used), it goes through a cycle of operation consisting of adsorption, water-washing, desorption and drying in the order mentioned, thus adsorbing and desorbing sulfurous acid gas ($SO_2$) and sulfuric anhydride gas ($SO_3$) repeatedly. For instance, when the active carbon in a position enters the water-washing and desorption region, no gas is circulated therethrough but water, supplied by a water feed pump is poured on the active carbon to wash off the sulfuric acid from said active carbon. A major portion of the sulfurous acid gas present in the waste gases is adsorbed by the active carbon in the form of sulfuric acid, because the sulfurous acid gas ($SO_2$) is oxidized by the oxygen ($O_2$) present in the waste gases into sulfuric anhydride gas ($SO_3$) by the catalytic action of active carbon, i.e.

$$SO_2 + \tfrac{1}{2} O_2 = SO_3$$

and the sulfuric anhydride thus formed reacts with water to give sulfuric acid. The water, after washing the active carbon, is let into a drain tank through a drain pipe.

SUMMARY OF THE INVENTION

An object of the present invention is to improve the method of desulfurizing combustion waste gases using the active carbon regeneration system and the manner of pouring water on the active carbon in a plant for operating said method, and to provide an apparatus for practicing said method.

Another object of the present invention is to provide a method of desulfurizing combustion waste gases, which enables a water pouring system used in a desulfurization plant to supply a large amount of water in a short period of time.

Still another object of the present invention is to propose an improved utilization of water which has been used for the desorption operation, whereby the amount of water to be required for desulfurization operation is minimized.

Still another object of the present invention is to provide a method of adjusting the temperature of the waste gases to be introduced into an adsorption region and a desorption region so as to be suitable for said respective regions and adjusting the temperature of water to be poured in the desorption region so as to be suitable for desorption operation, by effectively utilizing the heat energy possessed by the waste gases.

Still another object of the present invention is to provide a method of reducing the mist present in the desulfurized gases.

BRIEF DESCRIPTION OF THE DRAWINGS

FIG. 2 is a diagrammatical illustration, similar to FIG. 1, of another embodiment of the combustion waste gas desulfurization plant of this invention; and FIG. 3 is a graph illustrating the relationship between the amount of water poured and time.

DESCRIPTION OF THE PREFERRED EMBODIMENTS

Figure 1:
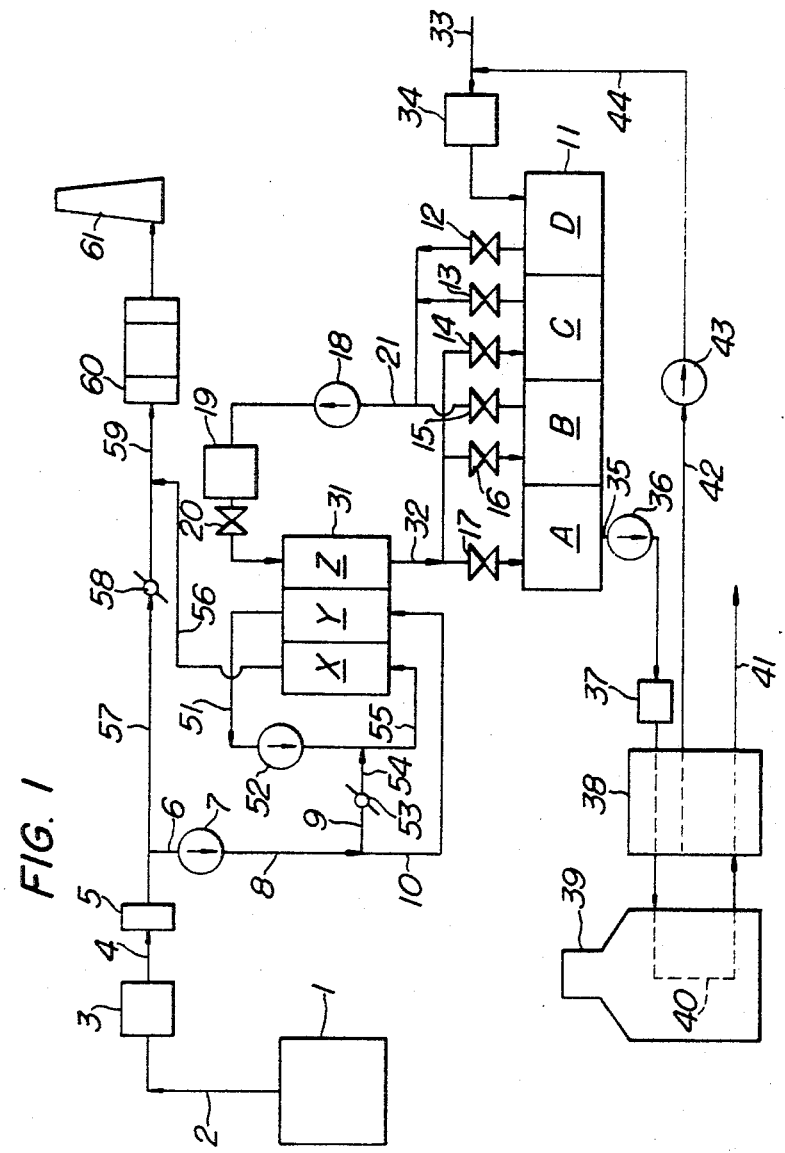
FIG. 1 is a diagrammatical illustration of an embodiment of the combustion waste gas desulfurization plant according to the present invention.

Referring to FIG. 1, a water tank 11 is divided into four sections A, B, C and D, and the operation of washing active carbon with water is commenced, first using the water in section B. In this case, the water in the section B is transferred and accumulated in a tank 19 through a pipe 21, prior to the washing operation, by opening a valve 15 and operating a pump 18. The water accumulated in the tank 19 is poured into a water-washing and desorption region Z for a predetermined period and then pouring of water is stopped for a while, during which period water is accumulated in the tank 19. In this manner, the water is poured into the region Z intermittently.

Such intermittent pouring of water makes it possible to transfer water in the tank 11 into the tank 19 without stopping the pump 18 and thereby to feed a large amount of water in a short period of time without making the capacity of the pump 18 large and without starting and stopping the pump frequently, i.e. without causing the pump to operate under a severe condition.

The water is poured on the active carbon beds in the water-washing and desorption region intermittently as described, for a period of 1 to 10 minutes at a time. Upon completion of the washing operation, the pump 18 is stopped for a period of 20 to 40 minutes to permit dehydration of the wet active carbon. The relationship between the amount of water poured and time is illustrated in FIG. 3, in which L represents the period of pouring of water, M the period in which the pouring of water is stopped and N the period in which the pouring of water is stopped completely so that the water contained in the adsorbent can be taken out by means of dripping and the pump 18 is held still operative until the tank 19 is completely filled with water.

By pouring water on the active carbon in the water-washing and desorption region Z intermittently in the manner described, the amount of sulfur oxides to be desorbed with a unit quantity of water can be increased. This is due to the following reason.

Namely, the sulfur oxides adsorbed by the active carbon are distributed uniformly within the active carbon and it may be conceivable that washing of the active carbon with water would be only effective to desorb the sulfur oxides present on the surface of the active carbon and those present deep in the active carbon would not be removed. However, the sulfur oxides present deep in the active carbon keep emerging on the washed surface of the active carbon due to diffusion and thus the water poured on the surface of the active carbon also washes off the sulfur oxides emerging on the surface of said carbon from the interior thereof. However, since the velocity of such diffusion is generally so small that the desorption of the sulfur oxides cannot be attained efficiently even when water is poured on the active carbon continuously.

Diffusion of the sulfur oxides towards the surface of the active carbon takes place even after pouring of water is stopped and, as a result, the sulfur oxide concentration on the surface of the active carbon rises and eventually becomes the same as that interior of the active carbon. Therefore, it will be appreciated that, by pouring water on the active carbon intermittently repeatedly at such a time interval as to permit the sulfur oxide concentration on the surface of the active carbon becomes the same as that interior of said active carbon upon diffusion of the sulfur oxides from deep in the active carbon to the surface thereof, washing efficiency of a unit quantity of water in desorbing the sulfur oxides present on and in the active carbon can be enhanced.

The character "N" in the graph of FIG. 3 represents the period during which dehydration of the wet active carbon is carried out. This operation is effective not only for the drying of the wet carbon bed which has been moved to the adsorbent drying region from the water-washing and adsorption region but also for the sake of the active carbon itself.

When the tank 19 is filled with water, the water is discharged for pouring on the active carbon in the desulfurization apparatus 31 by opening valves 20 and 17 and closing valves 12, 13 and 16, and the resultant washing is drained from the bottom of the desulfurization apparatus into the section A in the water tank 11 through a pipe 32. The desulfurization apparatus may be of the same construction as that disclosed in a co-pending application filed by the present applicants on the even date, entitled "Apparatus for the Removal of Sulfur Oxides from Waste Gases." When the water in the section B of water tank 11 has consumed to a predetermined level, water in the section C is used for washing the active carbon upon opening the valves 13 and 16 and closing the valve 17. In this case, the resultant washing is accumulated in the section B. Similarly, when the water in the section C has decreased to a predetermined amount, water in the section D is used upon opening the valve 12 and 14 and closing the valves 13 and 16, and the resultant washing is led into the section C. The section D of the water tank is supplied with water from a water supply line 33 through a heater 34. The heater 34 uses as its heating source the waste steam or waste hot water from the associating thermal power plant, such as the exhaust gases from a turbine or the hot water drained from said turbine.

The water tank 11, which in the illustration of FIG. 1 is divided into four sections A, B, C and D, must be divided into two or more sections and the capacity of each section must be larger than the amount of water poured in the region Z at a time. As can be understood, the sulfuric acid concentration in the water tank 11 is greater in the section A than B, in the section B than C and in the section C than D, and the sulfuric acid concentration in the section D is the same as that in the water to be poured on the active carbon.

The washing accumulated in the section A, which is highest in sulfuric acid concentration, is pumped out from said section by a pump 36 through a pipe 35 and, after passing through a filter 37, is sent to neutralizing plant for disposition, or to a sulfuric acid production plant or an ammonium sulfate production plant, according to the purpose for which it is to be used. Alternatively, as shown in FIG. 1, the washing may be led into a flash evaporator 38 to subject it to heat exchange with steam, thence to a condenser 39 to heat it therein as at 40, and back into the flash evaporator 38 to evaporate the water content under reduced pressure, to produce concentrated sulfuric acid.

The steam generated in the flash evaporator 38 is condensed by the washing from the filter 37 and the resultant water is recirculated to the water tank 11 for reuse through pipes 42, 44 by a pump 43. The heat required for the condensation of the washing in the condenser 39 is supplied by the condenser portion of or part of the exhaust gases or steam extraction from the turbine in the associating thermal power plant. Alternatively, an independent condenser may be provided separately.

The waste gases leaving a boiler 1 are led into a dust collector 5 through a duct 2, a preheater 3 and a duct 4 and, after having the dust removed therefrom are led into a duct 6 leading to the desulfurization apparatus. The waste gases in the duct 6 are pressurized by a blower 7 and forced into a duct 10 leading to the drying region and a duct 9 leading through the desorption region through a duct 8. The waste gases entering the duct 10 are led into the drying region Y in the desulfurization apparatus, wherein they are used for drying the active carbon which is wet as a result of water-washing and desorption operation. In this case, since the waste gases, drying the active carbon, simultaneously has part of the sulfurous acid gas therein adsorbed by the active carbon, the waste gases leaving the drying region contain a less amount of sulfurous acid gas and a greater amount of water.

The waste gases leaving the drying region are pressurized by a blower 52 and sent into a desorption region X in the desulfurization apparatus through a duct 55, together with fresh waste gases which enter the duct 55 through the duct 9 and a duct 54 while having its flow rate regulated by a damper 53. The flow rates in the duct 10 leading to the drying region and the duct 9 leading to the desorption region, are regulated by the damper 53 in accordance with the operating condition of the desulfurization apparatus.

Now, the waste gases having had the sulfurous acid gas removed therefrom, upon adsorption by the active carbon in the adsorption region X in the desulfurization apparatus 31, flow through a duct 56 and are joined with the waste gases flowing in a by-pass 57. The by-pass 57 is provided with a damper 58 which is closed during the normal operation of the boiler but is opened at the starting or stopping operation of the boiler or when the desulfurization apparatus has accidentally stopped its operation or is in repair. A duct 59 has a mist removing device 60 mounted thereon, so as to remove the mist in the waste gases before they are released into the atmosphere through a chimney 61.

According to another embodiment of the present invention shown in FIG. 2, the waste gases flowing through the duct 8 are diverged to flow in a duct 62 and a duct 63, and the flow rates in the respective ducts are regulated by a damper 64 provided in the duct 62. The waste gases flowing through the duct 63 are led into a heat exchanger 65 to be cooled therein and then led into the duct 62 through a duct 66 to be joined with the waste gases flowing through said duct 62. The waste gases thus joined are further joined with the waste gases flowing in a duct 67 and finally introduced into the adsorption region X in the desulfurization apparatus 31.

The high temperature waste gases are mixed with the low temperature waste gases as described, so as to control the temperature of the waste gases entering the adsorption region X to be below 100 to 130° C., and this is necessary because sulfurous acid gas in the waste gases is adsorbed by active carbon most efficiently at a temperature below 100 to 130° C. The waste gases leaving the adsorption region X are led into a duct 68 and, after having been pressurized by a blower 70 mounted in a duct 69, are led into a heat exchanger for heating, and thereafter introduced into the drying region Y through a duct 71. These waste gases to be used for drying the active carbon contain substantially no sulfur oxide since they have previously been passed through the adsorption region. The waste gases to be introduced into the adsorption region should contain substantially no water.

Now, the waste gases leaving the drying region Y are led into a duct 72 and are joined with the waste gases flowing in a by-pass duct 73 which is branched from the duct 68. The waste gases thus joined flow through a duct 74 and thence through the duct 59. The duct 73 has a damper 75 mounted therein, which regulates the flow rates of the waste gases flowing through the ducts 73 and 69 from the duct 68.

A heater 77 is provided on the pipe 21 to heat the water being supplied into the tank 19, whereby the water to be poured on the active carbon in the water-washing and desorption region Z is maintained at a temperature ranging from 70° to 95° C. By using the hot water, the time required for the extraction of sulfur oxides from the active carbon can be shortened drastically and accordingly, it is possible to desorb the sulfur oxides with a small amount of water. For example, when the extraction of sulfur oxides is effected using water at a temperature of 20° C. and water at a temperature of 80° C. separately, with the other conditions remaining the same, the amount of sulfur oxides extracted with the water at 80° C. is larger by about 40% than that extracted with the water at 20° C., for the same period.

The heater 77 uses as its heating source the waste gases leaving the dust collector 5 in the duct 4 and led thereto through a by-pass passage 76, and the cooled waste gases leaving the heater 77 are led into the duct 67.

What is claimed is:
1. A method of desulfurizing waste gases by passing said waste gases through a system comprising a sulfur oxide adsorption region, a water-washing and desorption region and an adsorbent drying region, said regions being changed-over from one after another at a predetermined time interval so that adsorption and desorption of the sulfur oxides and drying of the adsorbent are effected simultaneously in a different region of the system as a whole, said method comprises the step of intermittently pouring water into the water-washing and desorption region.

2. A method of desulfurizing waste gases according to claim 1, in which the step of intermittently pouring water comprises the steps of intermittently pouring water into the water-washing and desorption region from a water accumulation tank for a predetermined period for the desorption of the sulfur oxides, stopping the pouring of water, and accumulating water in said tank during the period while the pouring operation of the water is not carried out, whereby intermittent pouring of water is carried out.

3. A method of desulfurizing waste gases according to claim 1, in which the waste gases are introduced into the drying region for drying the wet adsorbent, the waste gases leaving said drying region are introduced into the adsorption region for the adsorption of the sulfur oxides contained therein and the waste gases leaving said adsorption region are discharged into the atmosphere.

4. A method of desulfurizing waste gases according to claim 1, in which the waste gases are introduced into the adsorption region for the adsorption of the sulfur oxides contained therein, the waste gases leaving said adsorption region are heated, thereafter the waste gases are introduced into the drying region for drying the wet adsorbent and the waste gases leaving said drying region are discharged into the atmosphere.

5. A method of desulfurizing waste gases according to claim 3, in which the pouring of water into the water-washing and desorption region for the desorption of the sulfur oxides is carried out in such a manner that the water to be poured is changed from the water having a high sulfuric acid concentration progressively to the water having a lower sulfuric acid concentration.

6. A method of desulfurizing waste gases according to claim 4, in which the pouring of water into the water-washing and desorption region for the desorption of the sulfur oxides is carried out in such a manner that the water to be poured is changed from the water having a high sulfuric acid concentration progressively to the water having a lower sulfuric acid concentration.

7. A method of desulfurizing waste gases according to claim 2, in which, after the completion of the intermittent pouring of water, the operation of pouring water is stopped completely to permit dehydration of the adsorbent.

8. A method of desulfurizing waste gases by passing said waste gases through a system comprising a sulfur oxide adsorption region, a water-washing and desorption region and adsorbent drying region, said regions being changed-over one after another at a predetermined time interval so that adsorption and desorption of the sulfur oxides and drying of the adsorbent are effected simultaneously in a different region of the system as a whole, said method comprising the steps of heating water by the waste gases, pouring the heated water into the water-washing and desorption region for the desorption of the sulfur oxides, stopping the pouring of the water, and accumulating water during a period while the operation of pouring water is not carried out, whereby intermittent pouring of water is carried out.

9. A method of desulfurizing waste gases according to claim 8, in which the waste gases are introduced into the adsorption region for the adsorption of the sulfur oxides contained therein, the waste gases leaving said adsorption region are heated, thereafter the waste gases are introduced into the drying region for drying the wet adsorbent and the waste gases leaving said drying region are discharged into the atmosphere.

10. A method of desulfurizing waste gases according to claim 8, in which the waste gases are introduced into the adsorbent drying region for drying the wet absorbent, the waste gases leaving said adsorbent drying region are introduced into the adsorption region for the adsorption of the sulfur oxides contained therein, and the waste gases leaving said adsorption region are discharged into atmosphere.

11. An apparatus for removing adsorbed sulfur oxides from a carbon adsorbent, wherein the oxides are removed from the surface of the absorbent during a desorption cycle, wherein the oxides diffuse from the interior portions of the adsorbent to the surface thereof during a diffusion cycle and wherein the desorption and diffusion cycles are repeated alternately, which comprises sulfur oxide adsorbing and drying regions, desorption tank means having an inlet side and an outlet side, water tank means containing a plurality of compartments, more than one of the compartments separately communicating with both the inlet side and the outlet side of the desorption tank means through conduit means, accumulation tank means disposed between the water tank means and the inlet side of the desorption tank means, pump means disposed between the accumulation tank means and the water tank means and valve means associated with each of the compartments of the water tank means and the accumulation tank means for selectively and intermittently adding water to the desorption tank means, the water being added to the desorption tank means only during the desorption cycle.

12. An apparatus including desorption tank means for removing adsorbed sulfur oxides from a carbon adsorbent according to claim 11, which further includes means for heating the water added to the desorption tank means.

References Cited

UNITED STATES PATENTS

| | | | |
|---|---|---|---|
| 2,992,895 | 7/1961 | Feustel et al. | 23—178 |
| 3,284,158 | 11/1966 | Johswich | 23—178 |
| 3,318,662 | 5/1967 | Pauling | 23—168 |
| 3,343,916 | 9/1967 | Cahn et al. | 55—179 |
| 3,201,921 | 8/1965 | Heyes | 55—78 |

REUBEN FRIEDMAN, Primary Examiner

C. N. HART, Assistant Examiner

U.S. Cl. X.R.

23—2, 178; 55—180

Notice of Adverse Decision in Interference

In Interference No. 99,022, involving Patent No. 3,473,297, Z. Tamura and Y. Hishinuma, METHOD AND APPARATUS FOR DESULFURIZING COMBUSTION WASTE GASES, final judgment adverse to the patentees was rendered June 28, 1977, as to claims 1 and 3.

[*Official Gazette October 25, 1977.*]